United States Patent
Shamkhi

(10) Patent No.: US 11,085,566 B2
(45) Date of Patent: Aug. 10, 2021

(54) PRESSURE SLEEVE

(71) Applicant: The Boeing Company, Chicago, IL (US)

(72) Inventor: Munir David Shamkhi, Renton, WA (US)

(73) Assignee: The Boeing Company, Chicago, IL (US)

( * ) Notice: Subject to any disclaimer, the term of this patent is extended or adjusted under 35 U.S.C. 154(b) by 78 days.

(21) Appl. No.: 15/852,601

(22) Filed: Dec. 22, 2017

(65) Prior Publication Data

US 2019/0195405 A1 Jun. 27, 2019

(51) Int. Cl.
| | |
|---|---|
| F16L 33/22 | (2006.01) |
| B64D 37/00 | (2006.01) |
| F16L 11/04 | (2006.01) |
| F16L 19/075 | (2006.01) |

(52) U.S. Cl.
CPC .......... *F16L 33/223* (2013.01); *B64D 37/005* (2013.01); *F16L 11/04* (2013.01); *F16L 19/075* (2013.01); *F16L 33/224* (2013.01)

(58) Field of Classification Search
CPC . F16L 33/2073; F16L 33/2071; F16L 33/223; F16L 33/22; F16L 33/224; F16L 19/0206
USPC .................. 285/242, 247, 243, 255
See application file for complete search history.

(56) References Cited

U.S. PATENT DOCUMENTS

| | | | | |
|---|---|---|---|---|
| 996,114 | A * | 6/1911 | Muller ................... | F16L 33/222 285/243 |
| 2,031,825 | A * | 2/1936 | Eastman ................ | F16L 33/222 285/243 |
| 2,059,920 | A * | 11/1936 | Weatherhead, Jr. ..... | F16L 19/10 285/341 |
| 2,147,353 | A * | 2/1939 | Scholtes ................ | F16L 33/224 285/148.16 |
| 2,147,354 | A * | 2/1939 | Scholtes ................ | F16L 33/224 285/248 |
| 2,541,200 | A * | 2/1951 | Brubaker ............... | F16L 33/224 285/249 |
| 2,561,827 | A * | 7/1951 | Soos ...................... | F16L 33/224 285/248 |
| 2,768,845 | A * | 10/1956 | Samiran ................. | F16L 19/06 285/331 |
| 2,905,488 | A | 9/1959 | Spence | |
| 3,195,933 | A * | 7/1965 | Jacobs .................... | F16L 19/14 285/247 |

(Continued)

OTHER PUBLICATIONS

Nonprovisional patent application filed concurrently entitled "Pressure Sleeve" in the name of The Boeing Company.

*Primary Examiner* — Aaron M Dunwoody
(74) *Attorney, Agent, or Firm* — Haynes and Boone, LLP

(57) ABSTRACT

An apparatus comprising a sleeve that comprises a tubular portion, a receiving portion, and a coupling portion. The tubular portion has an outer diameter that is substantially equal to an inner diameter of a flexible hose such that the tubular portion is capable of being inserted within the flexible hose. The receiving portion extends outward from the tubular portion to thereby define a channel between the receiving portion and the tubular portion for receiving an end portion of a flexible hose. The coupling portion is for coupling the sleeve, and thereby, the flexible hose, to a component.

20 Claims, 7 Drawing Sheets

(56) References Cited

U.S. PATENT DOCUMENTS

| | | | | |
|---|---|---|---|---|
| 3,834,742 | A * | 9/1974 | McPhillips | F16L 33/224<br>285/249 |
| 3,843,169 | A * | 10/1974 | Wise | F16L 19/083<br>285/39 |
| 3,971,566 | A * | 7/1976 | Levinsohn | F16J 15/0887<br>277/606 |
| 4,194,768 | A * | 3/1980 | Gretz | F16L 37/113<br>285/148.27 |
| 4,225,162 | A * | 9/1980 | Dola | F16L 25/01<br>174/665 |
| 4,842,548 | A * | 6/1989 | Bolante | F16L 47/04<br>174/653 |
| 4,900,068 | A * | 2/1990 | Law | F16L 33/222<br>285/139.2 |
| 5,042,849 | A | 8/1991 | Kersting | |
| 5,051,541 | A * | 9/1991 | Bawa | F16L 33/223<br>174/655 |
| 5,388,871 | A * | 2/1995 | Saitoh | F16L 19/0218<br>285/247 |
| 5,797,633 | A * | 8/1998 | Katzer | F16L 33/222<br>285/243 |
| 7,240,925 | B2 * | 7/2007 | Fukano | F16L 47/04<br>285/243 |
| 8,528,942 | B2 * | 9/2013 | Giordano | F16L 37/091<br>285/242 |
| 8,746,752 | B2 * | 6/2014 | Hayashi | F16L 41/021<br>285/247 |
| 8,910,980 | B2 * | 12/2014 | Neal | F16L 33/18<br>285/247 |
| 2007/0096464 | A1 * | 5/2007 | Spadotto | A01G 25/02<br>285/322 |
| 2007/0126230 | A1 * | 6/2007 | Feger | F16L 25/0045<br>285/242 |
| 2009/0236851 | A1 * | 9/2009 | Hampel | F16L 33/224<br>285/403 |
| 2012/0299296 | A1 * | 11/2012 | Lombardi, III | F16L 33/223<br>285/389 |
| 2014/0232107 | A1 * | 8/2014 | Raasch | F16L 33/00<br>285/257 |
| 2017/0097111 | A1 * | 4/2017 | De Nora | F16L 57/06 |
| 2018/0266598 | A1 * | 9/2018 | Kim | F16L 33/224 |
| 2019/0120411 | A1 * | 4/2019 | Choi | F16L 25/0036 |

* cited by examiner

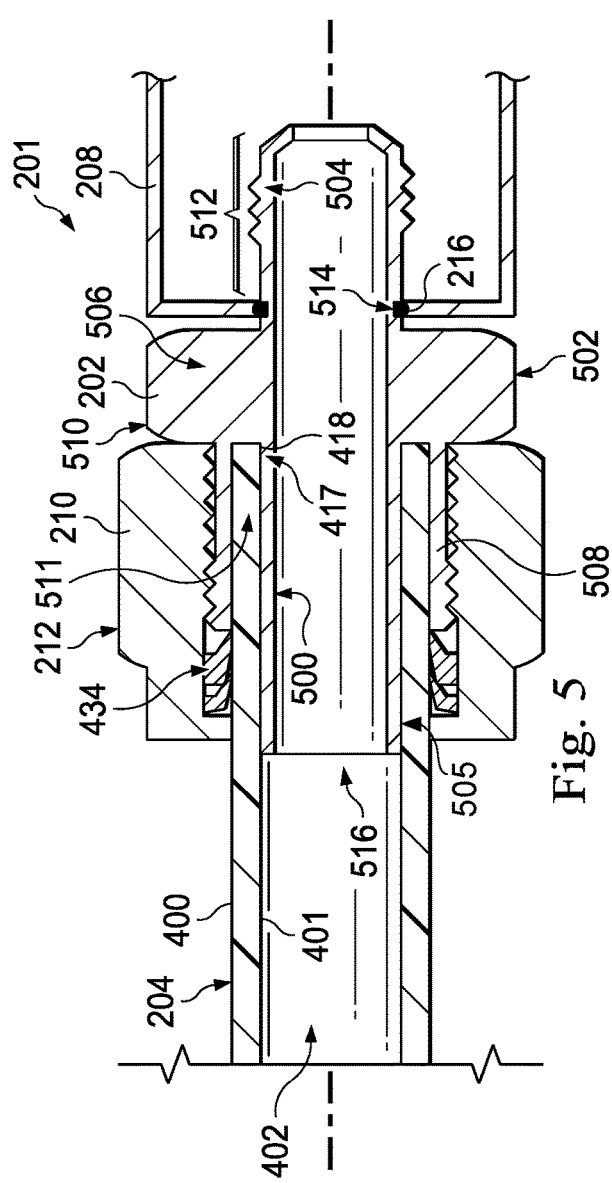
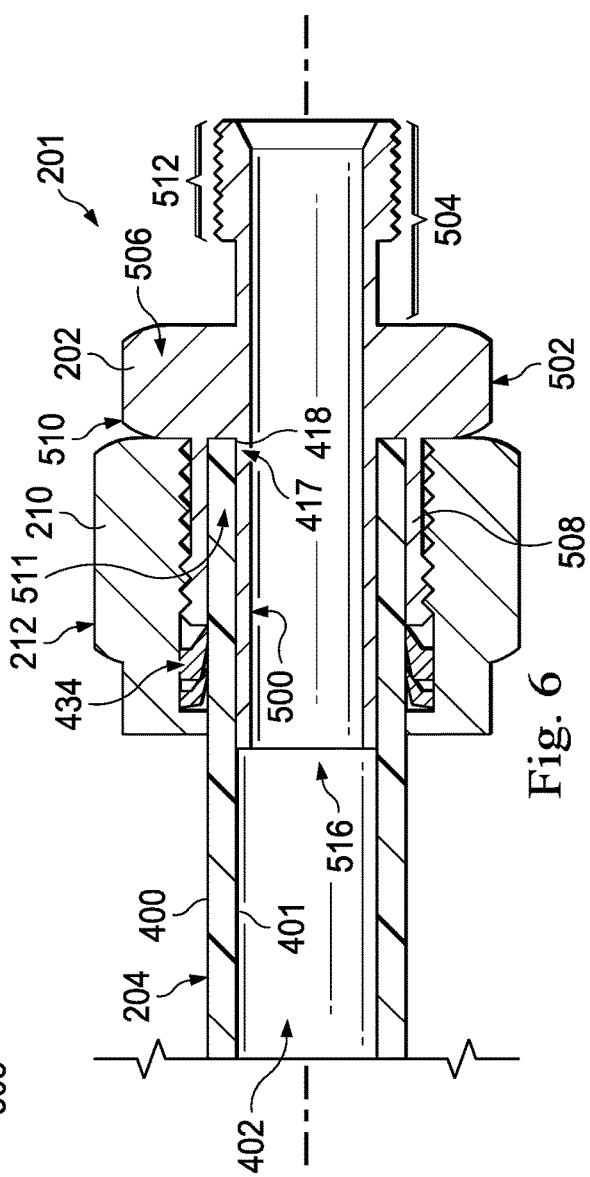

PRESSURE SLEEVE

CROSS REFERENCE TO RELATED APPLICATION

This application is related to U.S. patent application Ser. No. 15/852,517, entitled "Pressure Sleeve," filed Dec. 22, 2017, which is hereby incorporated by reference in its entirety.

FIELD

The present disclosure relates generally to coupling flexible hoses and, more particularly, to an apparatus and method for coupling flexible hoses using a pressure sleeve.

BACKGROUND

Various systems include fluid lines that are coupled together. For example, an aircraft may include multiple fluid lines that are coupled together and/or to other components in various configurations. These fluid lines may include rigid fluid lines, flexible fluid lines, or both. Rigid fluid lines are typically comprised of metal and used for the transfer of various types of fluid including, but not limited to, fuel, oil coolant, oxygen, hydraulic fluid, and other types of liquids and/or gases. Flexible fluid lines are typically comprised of flexible polymers. For example, flexible fluid lines may take the form of fluoropolymer tubes. In some cases, traditional methods of coupling rigid fluid lines may not work properly or as well for coupling flexible fluid lines because flexible fluid lines may move, bend, deform, or otherwise change shape in response to the application of pressure or force, pressure changes, temperature changes, or vibrations. Thus, one or more apparatuses and methods for coupling flexible fluid lines may be desired.

SUMMARY

In one illustrative embodiment, an apparatus comprises a sleeve that comprises a tubular portion, a receiving portion, and a coupling portion. The tubular portion has an outer diameter that is substantially equal to an inner diameter of a flexible hose such that the tubular portion is capable of being inserted within the flexible hose. The receiving portion extends outward from the tubular portion to thereby define a channel between the receiving portion and the tubular portion for receiving an end portion of a flexible hose. The coupling portion is for coupling the sleeve, and thereby, the flexible hose, to a component.

In another illustrative embodiment, a method is provided for coupling a flexible hose to a component. A tubular portion of a sleeve is inserted through a channel within a flexible hose such that an end portion of the flexible hose is received within a channel defined by a receiving portion of the sleeve that extends from the tubular portion. The sleeve is secured to the flexible hose using a fitting. The sleeve and thereby, the flexible hose, is coupled to the component using a coupling portion of the sleeve.

In yet another illustrative embodiment, a fuel system in an aircraft comprises a flexible fuel hose, a sleeve, and a fitting. The sleeve comprises a tubular portion, a receiving portion, and a coupling portion. The tubular portion has an outer diameter that is substantially equal to an inner diameter of a flexible fuel hose such that the tubular portion is capable of being inserted within the flexible fuel hose. The receiving portion extends outward from the tubular portion to thereby define a channel between the receiving portion and the tubular portion for receiving an end portion of a flexible fuel hose. The coupling portion is for coupling the sleeve, and thereby, the flexible fuel hose, to a component. The fitting clamps down on the receiving portion of the sleeve and the flexible fuel hose to secure the sleeve to the flexible fuel hose.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a cross-sectional view of a different configuration for a sleeve and for a coupling system in accordance with an example embodiment.

FIG. 6 is an illustration of the coupling system from FIG. 5 in which the coupling portion of the sleeve is implemented differently in accordance with an example embodiment.

DETAILED DESCRIPTION

The example embodiments provide a pressure sleeve for use in coupling flexible hoses with other flexible hoses and/or other components simply and easily. One configuration of the pressure sleeve may be used to couple two flexible hoses together. Another configuration of the pressure sleeve may be used to couple a flexible hose with some other component, such as a fastener device. The pressure sleeve may be inserted within one or more flexible hoses to help positively lock the one or more flexible hoses under vibrations, varying operational pressures, and/or varying environmental temperature changes. The pressure sleeve provided by the various illustrative embodiments may be useful in coupling together flexible fuel hoses in the fuel systems of aircraft.

Figure 1:
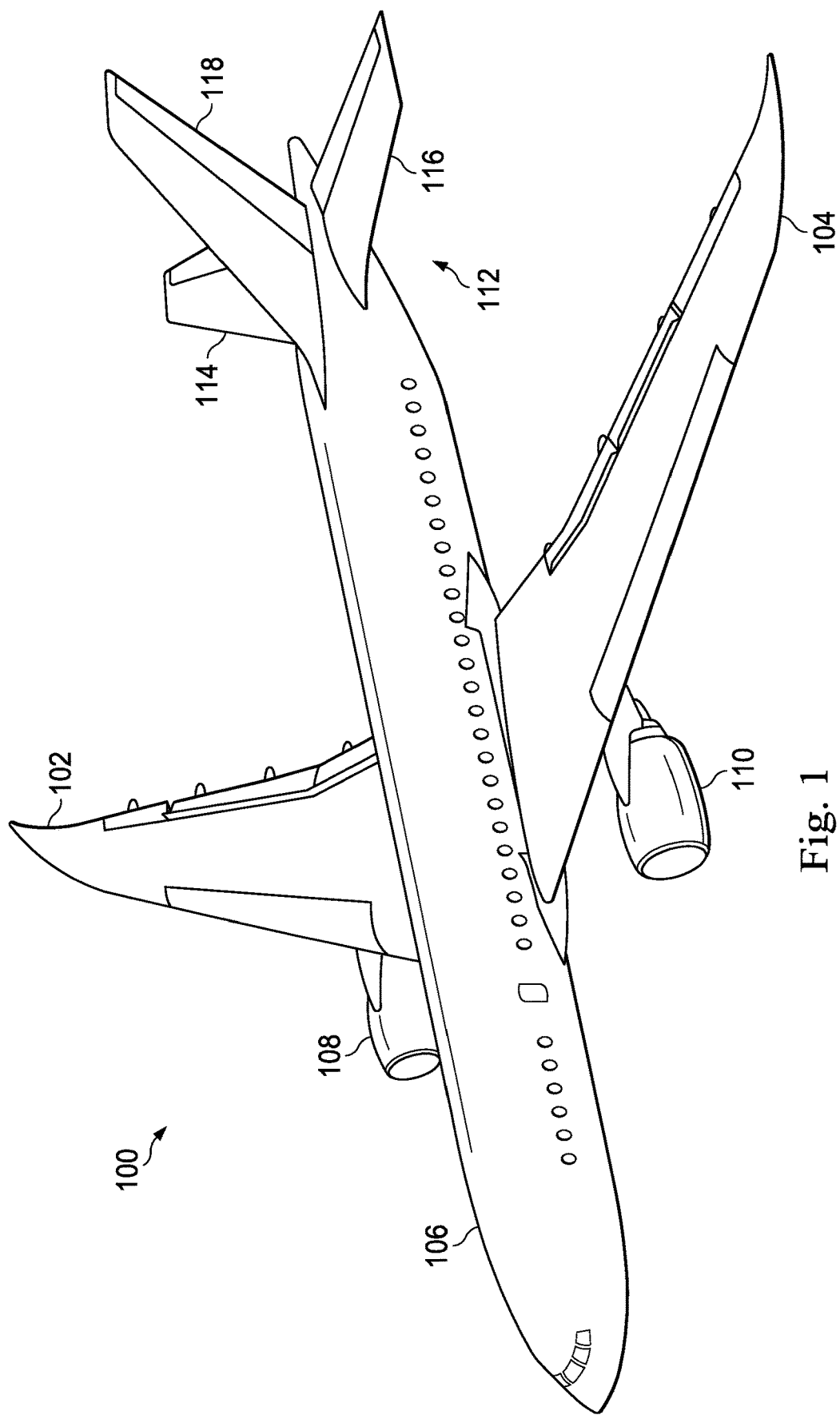
FIG. 1 is an illustration of a perspective view of an aircraft in accordance with an example embodiment.

With reference now to the figures, FIG. 1 is an illustration of an aircraft, depicted in accordance with an illustrative embodiment. Aircraft 100 includes wing 102 and wing 104 attached to fuselage 106. Aircraft 100 includes engine 108 attached to wing 102 and engine 110 attached to wing 104. Aircraft 100 also includes tail section 112. Horizontal stabilizer 114, horizontal stabilizer 116, and vertical stabilizer 118 are attached to tail section 112.

Aircraft 100 is an example of one type of platform that includes flexible fluid lines that may be coupled together in accordance with the illustrative embodiments described below. For example, without limitation, aircraft 100 may include a fuel system that includes flexible fluid lines that are coupled together using coupling systems implemented in a manner similar to coupling system 201 of FIG. 2 below. Coupling systems implemented similar to coupling system 201 of FIG. 2 may be used positively lock the flexible fluid lines together and/or to other components of aircraft 100. For example, one or more coupling systems may be used to positively lock flexible fluid lines to one or more bulkheads within wing 102, wing 104, and/or fuselage 106 of aircraft 100.

The positive locking of flexible fluid lines may mean ensuring that the flexible lines cannot work loose, or decouple, from one another due to vibrations. Using a coupling system implemented in a manner similar to coupling system 201 in FIG. 2 to couple flexible fluid lines together or to couple a flexible fluid line to some other component ensures that this coupling is able to the pressure changes, temperature changes, and vibrations experienced during operation of aircraft 100.

Figure 2:
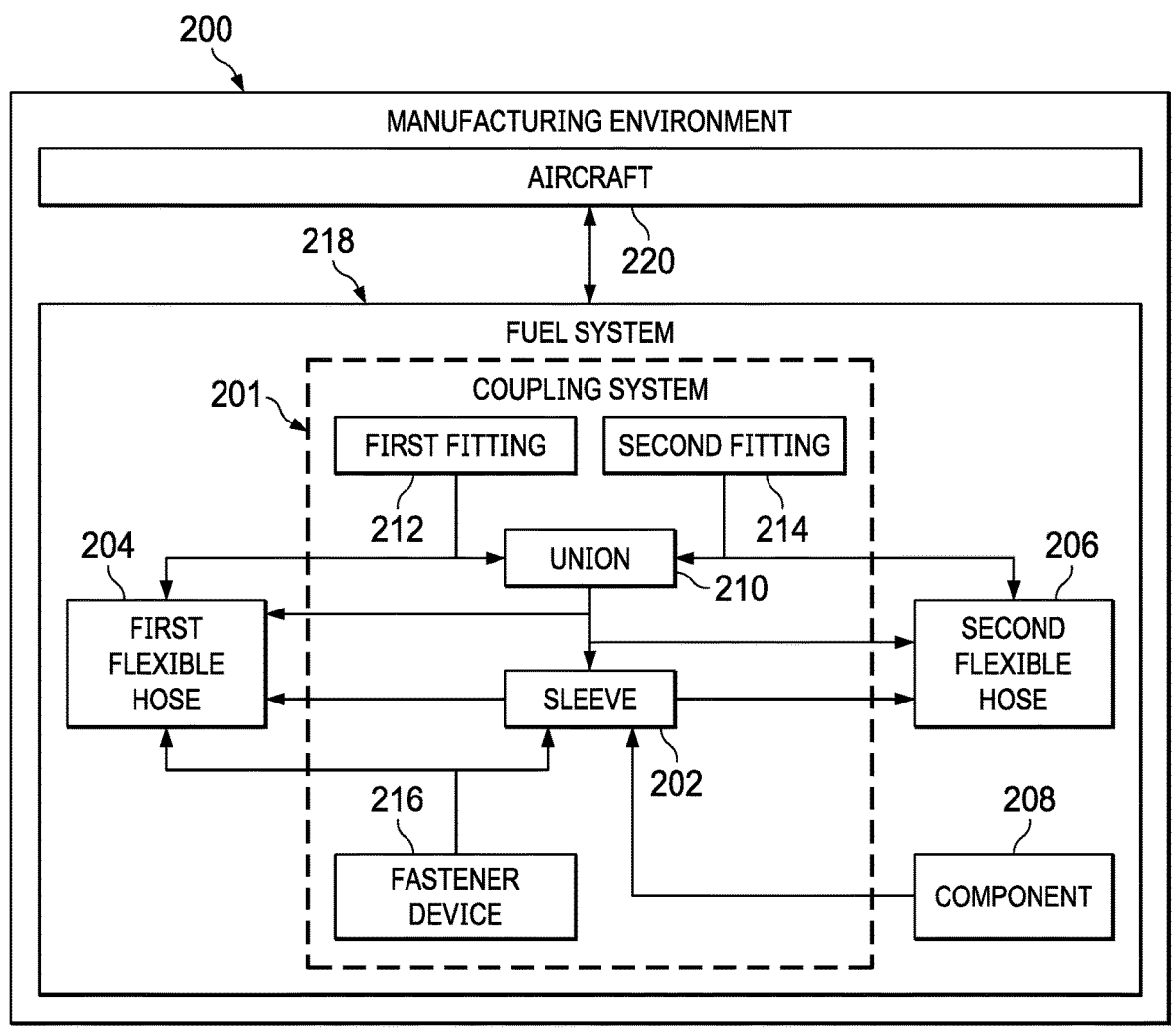
FIG. 2 is block diagram of a manufacturing environment in accordance with an example embodiment.

FIG. 2 is a block diagram of a manufacturing environment, depicted in accordance with an illustrative embodiment. Manufacturing environment 200 is one example of an environment in which coupling system 201 may be assembled and used to couple components. In one illustrative example, coupling system 201 includes sleeve 202 that may be used to couple first flexible hose 204 together with second flexible hose 206. In other illustrative examples, coupling system 201 includes sleeve 202 that may be used to couple first flexible hose 204 with some other component 208. Component 208 may take a number of different forms. For example, component 208 may take the form of a fitting, a bulkhead, a union, a nut, a B-type nut, a flareless fitting, a beam, some other type of fastener or fastener system, or some other type of structural component.

In these illustrative examples, each of first flexible hose 204 and second flexible hose 206 is a fluid line that allows the transfer of fluid through the fluid line. The fluid may comprise one or more liquids, one or more gases, or a combination thereof. Further, each of first flexible hose 204 and second flexible hose 206 may be comprised of one or more different types of flexible materials. For example, first flexible hose 204 and second flexible hose 206 may be comprised of one or more types of flexible polymers such that first flexible hose 204 and second flexible hose 206 are bendable or otherwise deformable. In one illustrative example, first flexible hose 204 and second flexible hose 206 are comprised of Tygon®, which is a type of flexible polymer tubing provided by Saint-Gobain Performance Plastics. In other illustrative examples, first flexible hose 204 and second flexible hose 206 may be comprised of a fluoropolymer, such as, but not limited to, polytetrafluoroethyline (PTFE).

Sleeve 202 may have different possible configurations. More particularly, sleeve 202 may be formed, or machined, to one of multiple possible configurations. For example, without limitation, sleeve 202 may be comprised of one or more metal materials and may be machined to form a first configuration or a second configuration. In the first configuration for sleeve 202, sleeve 202 may be used together with union 210, first fitting 212, and second fitting 214, to form coupling system 201 for coupling first flexible hose 204 and second flexible hose 206. In particular, sleeve 202 is a pressure sleeve that may be used to prevent the deflection of first flexible hose 204 or second flexible hose 206 into the flow path created through first flexible hose 204, sleeve 202, and second flexible hose 206. Further, sleeve 202 positively locks first flexible hose 204 with second flexible hose 206 such that neither first flexible hose 204 nor second flexible hose 206 may come loose due to vibrations, changes in pressure, and/or changes in temperature.

In the second configuration for sleeve 202, sleeve 202 may be used with first fitting 212 and fastener device 216 to couple first flexible hose 204 to component 208. In particular, in the second configuration, sleeve 202 is a pressure sleeve that may also be used to prevent the deflection of first flexible hose 204 into the flow path created between, or through, first flexible hose 204 and sleeve 202. Further, sleeve 202 positively locks first flexible hose 204 with component 208 such that first flexible hose 204 does not come loose from component 208 due to vibrations, changes in pressure, and/or changes in temperature.

In one illustrative example, first flexible hose 204 and second flexible hose 206 may be flexible fluid lines in fuel system 218 of aircraft 220. When used in fuel system 218, first flexible hose 204 and second flexible hose 206 may be referred to as fuel hoses. Aircraft 100 in FIG. 1 may be an example of one implementation for aircraft 220. In some illustrative examples, first flexible hose 204 and/or second flexible hose 206 may be coated with or embedded with conductive pigment for use in a drain system of fuel system 218 or for use in a nitrogen enriched air distribution system.

Figure 3:
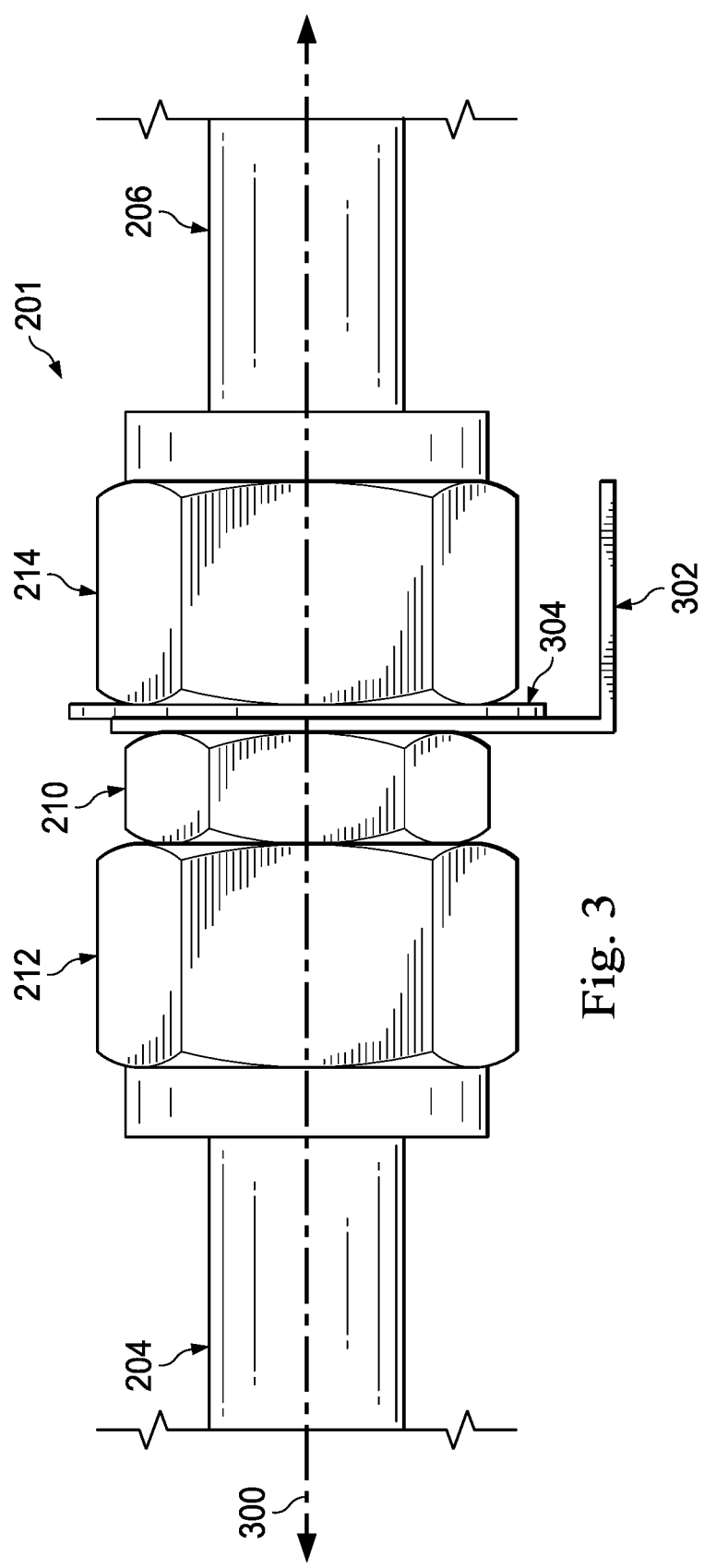
FIG. 3 is an illustration of a side view of one example implementation of a coupling system being used to couple one example implementation of a first flexible hose and a second flexible hose in accordance with an example embodiment.

FIG. 3 is an illustration of a side view of one example implementation of coupling system 201 being used to couple one example implementation of first flexible hose 204 and second flexible hose 206 from FIG. 2, depicted in accordance with an illustrative embodiment. As depicted, coupling system 201 includes union 210, first fitting 212, and second fitting 214. Coupling system 201 may also include sleeve 202 from FIG. 2, which is not shown in this view.

Union 210, first fitting 212, and second fitting 214, as well as first flexible hose 204 and second flexible hose 206, may be concentrically aligned relative to center axis 300. In other words, union 210, first fitting 212, second fitting 214, first flexible hose 204, and second flexible hose 206 may share center axis 300 when all of these components are coupled together. For example, union 210, first fitting 212, and second fitting 214 may have openings, or holes that extend through union 210, first fitting 212, and second fitting 214 in alignment with center axis 300.

In this illustrative example, support bracket 302 has been coupled to coupling system 201. In particular, bracket clamping nut 304 has been used to secure support bracket 302 to union 210 of coupling system 201. Support bracket 302 may allow coupling system 201 and thereby, first flexible hose 204 and second flexible hose 206, to be easily attached to one or more structural components. For example, support bracket 302 may be attached to a floor to help keep first flexible hose 204 and second flexible hose 206 a selected distance above the floor. In other illustrative examples, support bracket 302 may be attached to a wall to keep first flexible hose 204 and second flexible hose 206 a selected distance away from the wall.

Figure 4:
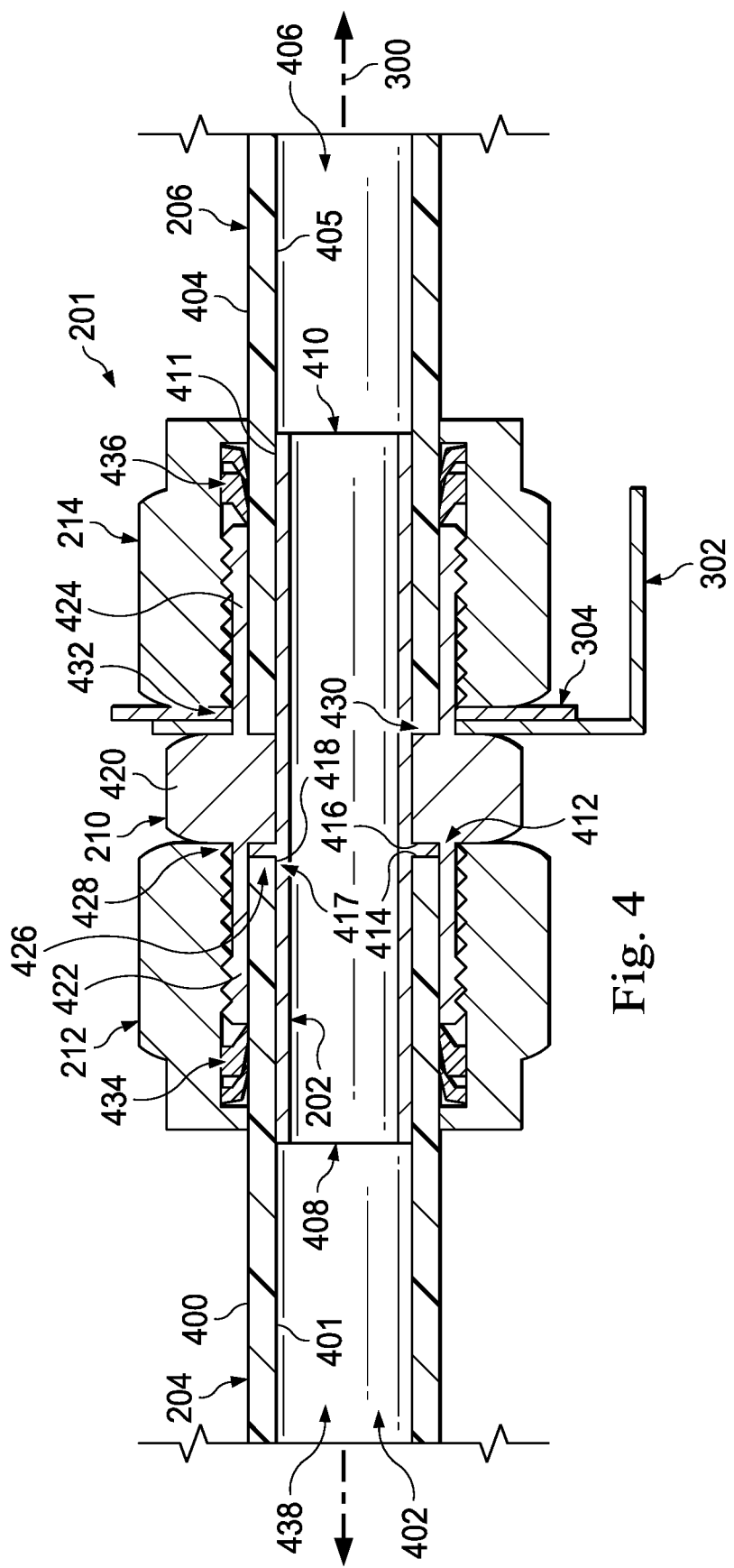
FIG. 4 is an example of a cross-sectional view of the coupling system, the first flexible hose, and the second flexible hose from FIG. 3 in accordance with an example embodiment.

FIG. 4 is an example of a cross-sectional view of coupling system 201, first flexible hose 204, and second flexible hose 206 from FIG. 3, depicted in accordance with an illustrative embodiment. In particular, the cross-sectional view may be a view with respect to an axial cross-section taken substantially parallel to center axis 300.

As depicted, first flexible hose 204 has outer surface 400 and inner surface 401. Inner surface 401 defines channel 402 through first flexible hose 204. Channel 402 may also be referred to as a tubular passageway through first flexible hose 204. Second flexible hose 206 has outer surface 404 and inner surface 405. Inner surface 405 defines channel 406 through second flexible hose 206. Channel 406 may be referred to as a tubular passageway through second flexible hose 206.

Sleeve 202 is visible in this view in FIG. 4. Sleeve 202 is partially inserted within and extends through channel 402 of first flexible hose 204. Further, sleeve 202 is partially inserted within and extends through channel 406 of second flexible hose 206. In particular, sleeve 202 has first end 408 that is located within channel 402 of first flexible hose 204 and second end 410 that is located within channel 406 of second flexible hose 206.

In this illustrative example, sleeve 202 has an outer diameter that is substantially equal to an inner diameter of first flexible hose 204 as defined by inner surface 401 and that is substantially equal to an inner diameter of second flexible hose 206 as defined by inner surface 405 of second flexible hose 206. Thus, sleeve 202 contacts inner surface 401 of first flexible hose 204 and inner surface 405 of second flexible hose 206.

As depicted, sleeve 202 has outer surface 411 and flange 412 that extends from outer surface 411 of sleeve 202. For example, outer surface 411 defines a tubular portion of sleeve 202 that is configured for insertion and placement within first flexible hose 204 and second flexible hose 206. Flange 412 may be an annular flange that extends from outer surface 411 of sleeve 202. For example, flange 412 may be an annular ring.

Flange 412 has first surface 414 and second surface 416. When sleeve 202 is inserted in first flexible hose 204 as shown in FIG. 4, flange 412 contacts end portion 417 of first flexible hose 204. More particularly, first surface 414 of flange 412 engages edge 418 of first flexible hose 204 at end portion 417. First surface 414 of flange 412 engages edge 418 of first flexible hose 204 by contacting, or abutting, edge 418. In these illustrative examples, flange 412 has a radial length substantially equal to a thickness of edge 418 of first flexible hose 204. The radial length of flange 412 may be referred to as the width of flange 412 in some cases.

In this illustrative example, union 210 is coupled to sleeve 202, first flexible hose 204, and second flexible hose 206. Union 210 includes body 420, first portion 422, and second portion 424. First portion 422 extends from body 420 to thereby define first seat 426 and second seat 428. Second portion 424 extends from body 420 to thereby define third seat 430 and fourth seat 432. First seat 426, second seat 428, third seat 430, and fourth seat 432 create structural areas within other components may be positioned to thereby engage union 210. First seat 426 and second seat 428 may each include and be defined by a portion of body 420 and a portion of, or a section of, first portion 422 of union 210. Third seat 430 and fourth seat 432 may each include and be defined by a portion of body 420 and a portion of, or a section of, second portion 424 of union 210.

For example, union 210 may be positioned around sleeve 202 and first flexible hose 204 such that flange 412 engages first seat 426 of union 210 and first flexible hose 204 engages first portion 422 of union 210. In particular, second surface 416 of flange 412 engages first seat 426 of union 210 and outer surface 400 of first flexible hose 204 engages first portion 422 of union 210. Further, second flexible hose 206 engages third seat 430 of union 210.

Union 210 is secured to sleeve 202, first flexible hose 204, and second flexible hose 206 by a pair of fittings, which may include first fitting 212 and second fitting 214. In this illustrative example, first fitting 212 and second fitting 214 both take the form of clamps. For example, first fitting 212 may include clamping feet 434 and second fitting 214 may include clamping feet 436. First fitting 212 is positioned around first flexible hose 204 and union 210 such that first fitting 212 engages second seat 428 of union 210. Similarly, second fitting 214 is positioned around second flexible hose 206 and union 210 such that second fitting 214 engages fourth seat 432 of union 210. In some cases, when support bracket 302 is present, second fitting 214 may partially engage fourth seat 432 or engages only second portion 424 of union 210.

When first fitting 212 is positioned around first flexible hose 204 and union 210 to secure union 210 to first flexible hose 204 and sleeve 202 within first flexible hose 204, first fitting 212 applies pressure to first flexible hose 204. Without sleeve 202, this pressure might cause first flexible hose 204 to deflect, or bend, into flow path 438 that is created through first flexible hose 204, second flexible hose 206, and sleeve 202. Sleeve 202 counteracts this pressure applied by first fitting 212, and therefore the deflection of first flexible hose 204.

Similarly, when second fitting 214 is positioned around second flexible hose 206 and union 210 to secure union 210 to second flexible hose 206 and sleeve 202 within second flexible hose 206, second fitting 214 applies pressure to second flexible hose 206. Without sleeve 202, this pressure might cause second flexible hose 206 to deflect, or bend, into flow path 438 that is created through first flexible hose 204, second flexible hose 206, and sleeve 202. Sleeve 202 counteracts this pressure applied by second fitting 214, and therefore the deflection of second flexible hose 206.

As depicted, in some illustrative examples, support bracket 302 may be coupled to union 210. For example, in these illustrative examples, support bracket 302 is disposed around union 210 and may at least partially engage fourth seat 432 of union 210. Bracket clamping nut 304 is used to secure support bracket 302 to union 210, and thereby coupling system 201. Of course, in other illustrative examples, support bracket 302 may be coupled to coupling system 201 in some other manner.

FIG. 5 is an illustration of a cross-sectional view of a different configuration for sleeve 202 and for coupling system 201, depicted in accordance with an illustrative embodiment. The configuration of coupling system 201 depicted in FIG. 5 may be used to couple first flexible hose 204 to component 208 rather than to second flexible hose 206 from FIG. 4. In FIG. 5, coupling system 201 includes sleeve 202, first fitting 212, and fastener device 216. First flexible hose 204 and first fitting 212 in FIG. 5 may be implemented similar to first flexible hose 204 and first fitting 212 in FIG. 4. But sleeve 202 may have a different configuration than sleeve 202 in FIG. 4. In other illustrative examples, coupling system 201 may include only sleeve 202 and first fitting 212.

As depicted, sleeve 202 includes tubular portion 500, receiving portion 502, and coupling portion 504. In particular, sleeve 202 may be machined such that tubular portion 500, receiving portion 502, and coupling portion 504 are formed as part of sleeve 202. In one illustrative example, a metal structure may be machined to create sleeve 202 having tubular portion 500, receiving portion 502, and coupling portion 504.

Tubular portion 500 is configured for insertion and positioning within channel 402 of first flexible hose 204. In particular, tubular portion 500 may have an outer diameter defined by outer surface 505 of sleeve 202 that is substantially equal to the inner diameter defined by inner surface 401 of first flexible hose 204. In this illustrative example, tubular portion 500 of sleeve 202 fully extends within first flexible hose 204 such that tubular portion 500 is entirely positioned within first flexible hose 204. However, in other illustrative examples, tubular portion 500 may only partially extend within channel 402.

Receiving portion 502 extends outward from tubular portion 500. Receiving portion 502 is used to receive end portion 417 of the wall of first flexible hose 204 defined between outer surface 400 and inner surface 401 of first flexible hose 204. As depicted, receiving portion 502 includes flange section 506 and extension 508. In some cases, receiving portion 502 may also include tool feature 510.

Flange section 506 extends outward from tubular portion 500 and circumferentially around tubular portion 500. In particular, flange section 506 may be an annular flange circumferentially disposed around tubular portion 500 and extending radially outward from tubular portion 500. In other words, flange section 506 may extend radially outward from tubular portion 500 and around a portion of or around the entire circumference of tubular portion 500.

Extension 508 extends from flange section 506 in a direction substantially aligned with tubular portion 500 to thereby define channel 511 between receiving portion 502 and tubular portion 500 for receiving end portion 417 of first flexible hose 204. In particular, extension 508 extends away from flange section 506 in a direction substantially parallel to center axis 300. Extension 508 and tubular portion 500 may be substantially concentrically aligned. Further, extension 508 may circumferentially extend around tubular portion 500, and thereby, first flexible hose 204 to create channel 511.

Tool feature 510, when present, enables a tool to readily engage with receiving portion 502 of sleeve 202. For example, tool feature 510 may be shaped to enable a tool, such as a wrench or pliers, to engage with receiving portion 502 and thereby, manipulate sleeve 202. For example, tool feature 510 may include one or more wrench flats that allow a wrench to engage tool feature 510. In one illustrative example, tool feature 510 has a hexagonal cross-sectional shape. By allowing a tool to engage receiving portion 502, tool feature 510 makes it easier for that tool to rotate sleeve 202 about center axis 300, translate sleeve 202 in a direction along center axis 300, and/or move sleeve 202 in some other manner.

Coupling portion 504 of sleeve 202 is used to couple sleeve 202, and thereby, first flexible hose 204, to some other component, such as component 208. In this illustrative example, component 208 takes the form of a nut. But in other illustrative examples, component 208 may take other forms. For example, component 208 may take the form of a particular type of nut (e.g. B-type nut), a union, a bulkhead, a flareless fitting, or some other type of structural component.

Coupling portion 504 includes end section 512. End section 512 is a portion of, or section of, coupling portion 504 that is shaped to substantially match, substantially conform to, or otherwise engage a corresponding shape of component 208 or some other type of component. In other words, end section 512 may be machined such that end section 512 takes the shape of some type of fastener device, mating component, or other type of coupling structure for use in directly coupling sleeve 202 to component 208. As one illustrative example, end section 512 may be shaped to substantially have the shape of a B-type nut.

In some illustrative examples, coupling portion 504 includes groove 514 formed along outer surface 505 of sleeve 202. Groove 514 may extend partially or fully around a circumference of coupling portion 504 of sleeve 202. Groove 514 may be shaped to receive fastener device 216, which may be used to secure component 208 to end section 512 of sleeve 202. For example, fastener device 216 may take the form of a locking pin, or a radial locking pin.

In this illustrative example, first fitting 212 is positioned around first flexible hose 204 and receiving portion 502 of sleeve 202 to secure sleeve 202 to first flexible hose 204. For example, first fitting 212 may apply pressure to first flexible hose 204 to secure together sleeve 202 and first flexible hose 204. Without sleeve 202, this pressure might cause first flexible hose 204 to deflect, or bend, into flow path 516 that is created through first flexible hose 204 and sleeve 202. Sleeve 202 counteracts the pressure applied by first fitting 212, and therefore the deflection of first flexible hose 204.

FIG. 6 is an illustration of coupling system 201 from FIG. 5 in which coupling portion 504 of sleeve 202 is implemented differently, depicted in accordance with an illustrative embodiment. In FIG. 6, coupling portion 504 is implemented with a different type of end section 512. Further, coupling portion 504 does not include groove 514 shown in FIG. 5. In FIG. 6, end section 512 may be shaped for attachment to some other type of component other than component 208 shown in FIG. 2.

For example, end section 512 may be shaped for direct attachment to a bulkhead (not shown). In one illustrative example, end section 512 may be shaped for insertion into a fastener device, wherein the shape of end section 512 is sufficient to attach sleeve 202, and thereby first flexible hose 204, to the fastener device. In still other illustrative examples, end section 512 may be shaped for attachment or coupling to another end section of another sleeve similar to sleeve 202 (e.g. a different end section of a different sleeve, where the end section is shaped similar to end section 512 depicted in FIG. 5). The illustrations of coupling system 201 in FIGS. 2-6 are not meant to imply physical or architectural limitations to the manner in which an illustrative embodiment may be implemented. Other components in addition to or in place of the ones illustrated may be used. Some components may be optional. Further, as described above, the different components shown in FIGS. 3-6 may be illustrative examples of how components shown in block form in FIG. 2 can be implemented as physical structures. Additionally, some of the components in FIGS. 3-6 may be combined with components in FIG. 2, used with components in FIG. 2, or a combination thereof.

Figure 7:
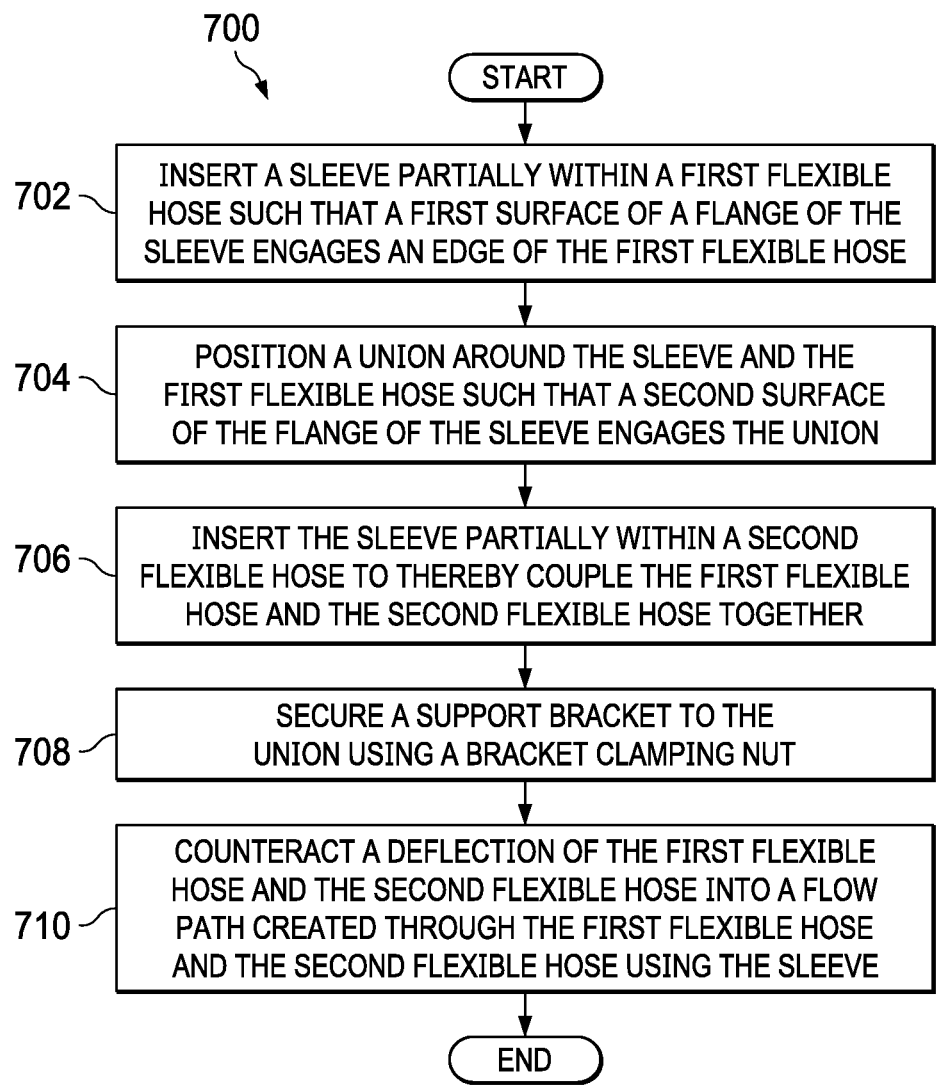
FIG. 7 is a flowchart illustration of a process for coupling flexible hoses in accordance with an example embodiment.

FIG. 7 is a flowchart illustration of a process 700 for coupling flexible hoses, depicted in accordance with an illustrative embodiment. The process illustrated in FIG. 7 may be implemented using coupling system 201 described in FIG. 2 and in FIGS. 3 and 4. Accordingly, the process 700 is described below with continuing reference to FIGS. 2, 3, and 4.

The process 700 may begin by inserting sleeve 202 partially within first flexible hose 204 such that first surface of 414 of flange 412 of sleeve 202 engages edge 418 of first flexible hose 204 (step 702). Sleeve 202 positively locks with first flexible hose 204 in a manner that prevents first flexible hose 204 from coming loose during vibrations or operational pressure or temperature changes. Next, union 210 may be positioned around sleeve 202 and first flexible hose 204 such that second surface 416 of flange 412 of sleeve 202 engages union 210 (step 704).

Then, sleeve 202 may be inserted partially within second flexible hose 206 to thereby couple first flexible hose 204 and the second flexible hose together 206 (Step 706). Sleeve 202 positively locks with second flexible hose 206 in a manner that prevents second flexible hose 206 from coming loose during vibrations or operational pressure or temperature changes.

Union 210 is coupled with first flexible hose 204, second flexible hose 206, and sleeve 202 using a pair of fittings (step 708). For example, at step 708, first fitting 212 may be used to secure union 210 to first flexible hose 204 and sleeve 202, while second fitting 214 may be used to secure union 210 to second flexible hose 206 and sleeve 202.

A deflection of first flexible hose 204 and second flexible hose 206 into a flow path created through first flexible hose 204 and second flexible hose 206 is counteracted using sleeve 202 (step 710), with the process terminating thereafter. For example, securing the pair of fittings to union 210, first flexible hose 204, and second flexible hose 206 may apply pressure to first flexible hose 204. Without sleeve 202 counteracting this pressure, first flexible hose 204 might bend or deform in an undesired manner.

Figure 8:
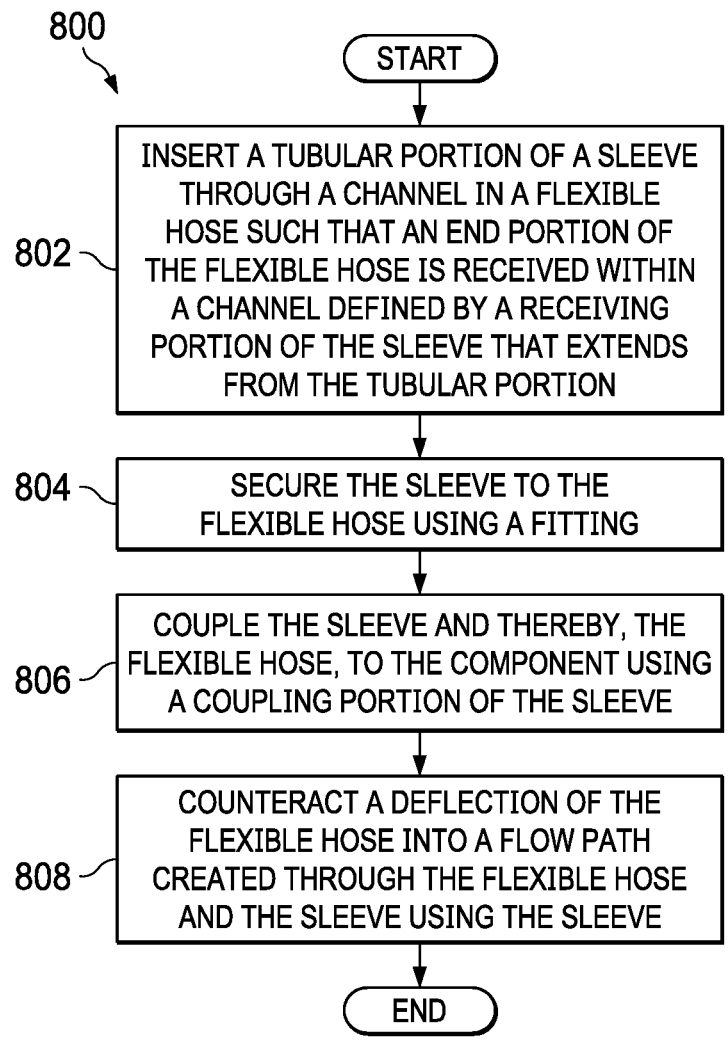
FIG. 8 is a flowchart illustration of a process for coupling a flexible hose to a component in accordance with an example embodiment.

FIG. 8 is a flowchart illustration of a process 800 for coupling a flexible hose to a component, depicted in accordance with an illustrative embodiment. The process 800 illustrated in FIG. 8 may be implemented using coupling system 201 described in FIG. 2 and in FIGS. 5 and 6. Accordingly, the process 800 is described below with continuing reference to FIGS. 2, 5, and 6.

The process 800 may begin by inserting tubular portion 500 of sleeve 202 through channel 402 within first flexible hose 204 such that end portion 417 of first flexible hose 204 is received within channel 511 defined by receiving portion 502 of sleeve 202 that extends outward from tubular portion 500 (step 802). At step 802, channel Sills defined between receiving portion 502 of sleeve 202 and tubular portion 500 of sleeve 202. In particular, flexible hose 204 may be received within channel 511 such that end portion 417 of first flexible hose 204 engages, or contacts flange section 506 of receiving portion 502 of sleeve 202. Channel 511 is sized and shaped such that outer surface 400 of first flexible hose 204 contacts extension 508 of receiving portion 502 of sleeve 202 and inner surface 401 of first flexible hose 204 contacts tubular portion 500 of sleeve 202 when first flexible hose 204 is received within channel 511.

Sleeve 202 is secured to first flexible hose 204 using first fitting 212 (step 804). In one illustrative example, at step 804, first fitting 212 takes the form of a clamp that clamps down on receiving portion 502 of sleeve 202 and first flexible hose 204, which thereby applies pressure on receiving portion 502 of sleeve 202 and first flexible hose 204. Sleeve 202 counteracts the pressure being applied by first fitting 212 to ensure that sleeve 202 positively locks first flexible tube 204.

Thereafter, sleeve 202, and thereby, first flexible hose 24, is coupled to component 208 using coupling portion 504 of sleeve 202 (step 806). A deflection of first flexible hose 204 into a flow path created through first flexible hose 204 and sleeve 202 is counteracted using sleeve 202 (step 808), with the process terminating thereafter. For example, securing first flexible hose 204 to sleeve 202 using first fitting 212 may apply pressure to first flexible hose 204. Without sleeve 202 counteracting this pressure, first flexible hose 204 might deflect or otherwise bend into the flow path in an undesired manner.

Thus, the example embodiments described above provide a method and apparatus for coupling flexible hoses together. For example, a pressure sleeve, such as sleeve 202, may be used to couple flexible hoses that are coated with or embedded with conductive pigmentation for use in a fuel drain system and/or a nitrogen-enriched air distribution system. Sleeve 202 provides positive locking for these flexible hoses for use under changing operational pressures and environmental temperatures. Thus, sleeve 202 may be used to couple two flexible hoses together or to couple a flexible hose with another component in a simple, easy, and cost-effective manner.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and five of item C; three of item B and six of item C; or some other suitable combination.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An apparatus comprising:
  a sleeve comprising a tubular portion, a receiving portion, and a coupling portion that are monolithically formed, wherein:

the tubular portion has an outer diameter that is substantially equal along a length of the tubular portion and that is substantially equal to an inner diameter of a flexible hose;

the receiving portion comprises:

a flange section that extends radially outward from the tubular portion; and an extension that extends from the flange section in a direction substantially concentrically aligned with the tubular portion to thereby define a channel between the extension and the tubular portion, the channel having a uniform radial width substantially equal to a thickness of the flexible hose to receive the flexible hose when the tubular portion is inserted within the flexible hose, and the extension including first outer threads for engaging a fitting; the coupling portion is configured for coupling the sleeve to a component; and the coupling portion extends out from the receiving portion in an opposite direction from the tubular portion and includes second outer threads for engaging with the component.

2. The apparatus of claim 1, further comprising:

the fitting engaged with the first outer threads of the extension of the sleeve, wherein the fitting comprises clamping feet that apply pressure to the flexible hose when the fitting is engaged with the sleeve and the flexible hose has been received within the channel.

3. The apparatus of claim 2, wherein the extension ends before the clamping feet when the fitting is engaged with the sleeve and wherein the tubular portion of the sleeve extends past the clamping feet of the fitting such that the sleeve counteracts a deflection of the flexible hose into a flow path through the flexible hose and the sleeve in response to the pressure being applied by the fitting.

4. The apparatus of claim 1, wherein the coupling portion comprises a groove extending at least partially around a circumference of the sleeve and further comprising:

a fastener device positioned within the groove to secure the component to the sleeve.

5. The apparatus of claim 4, wherein the fastener device is a locking pin and wherein the component is selected from one of a nut, a B-type nut, a union, a bulkhead, and a flareless fitting.

6. The apparatus of claim 1, wherein the coupling portion comprises:

an end section having the second outer threads and that is shaped to substantially match a corresponding shape of the component to which the sleeve is to be coupled.

7. The apparatus of claim 1, wherein a portion of the coupling portion that extends away from the flange section of the receiving portion has a same outer diameter as the tubular portion.

8. The apparatus of claim 1, wherein the receiving portion includes a tool feature that allows a tool to engage with the receiving portion.

9. The apparatus of claim 8, wherein the tool feature has a hexagonal cross-sectional shape.

10. The apparatus of claim 1, further comprising the flexible hose coupled with the tubular portion, wherein the flexible hose is comprised of a flexible material and is coated with a conductive pigment.

11. The apparatus of claim 1, wherein an end portion of the flexible hose contacts the extension, the tubular portion, and the flange section when the end portion of the flexible hose is received within the channel.

12. The apparatus of claim 1, wherein the tubular portion, the receiving portion, and the coupling portion of the sleeve are machined from a metal structure; and wherein an inner surface of a channel that extends through the tubular portion, the receiving portion, and the coupling portion is a continuous surface.

13. A method for coupling a flexible hose to a component, the method comprising: inserting a tubular portion of a sleeve within the flexible hose such that an end portion of the flexible hose is received within a channel defined by the tubular portion, a flange section that extends radially outward from the tubular portion, and an extension that extends from the flange section in a direction substantially concentrically aligned with the tubular portion, the channel having a uniform radial width substantially equal to a thickness of the flexible hose; securing the sleeve to the flexible hose using a fitting and first outer threads of the extension; and coupling the sleeve and the flexible hose to the component using second outer threads on a coupling portion of the sleeve that extends out from a receiving portion of the sleeve in an opposite direction from the tubular portion, the tubular portion, the receiving portion, and the coupling portion being monolithically formed such that an inner surface of the channel, which extends through the tubular portion, the receiving portion, and the coupling portion, is a continuous surface.

14. The method of claim 13, further comprising:

counteracting a deflection of the flexible hose into a flow path created through the flexible hose and the sleeve using the sleeve.

15. The method of claim 13, wherein securing the sleeve to the flexible hose comprises:

securing the fitting to the sleeve by engaging the first outer threads of the extension; and clamping down on the flexible hose using clamping feet of the fitting, thereby applying pressure on the flexible hose; and counteracting the pressure being applied by the fitting using the tubular portion of the sleeve, the tubular portion extending past the clamping feet of the fitting.

16. The method of claim 13, wherein coupling the sleeve and the flexible hose, to the component comprises:

coupling an end section of the coupling portion to the component, wherein the end section is machined to substantially match a corresponding shape of the component, and wherein the component is selected from one of a nut, a B-type nut, a union, a bulkhead, and a flareless fitting.

17. A fuel system in an aircraft, the fuel system comprising:

a flexible fuel hose;

a sleeve comprising:

a tubular portion, wherein the sleeve has an outer diameter that is substantially equal along a length of the tubular portion and that is substantially equal to an inner diameter of the flexible fuel hose such that the tubular portion positively locks the flexible fuel hose;

a receiving portion comprising:

a flange section that extends radially outward from the tubular portion; and an extension that extends from the flange section in a direction substantially concentrically aligned with the tubular portion to thereby define a channel between the extension and the tubular portion, the channel having a uniform radial width substantially equal to a thickness of the flexible hose, and the extension including first outer threads for engaging a fitting; and a coupling portion for coupling the sleeve and flexible fuel hose to a component,
   wherein the coupling portion extends out from the receiving portion in an opposite direction from the tubular portion and includes second outer threads for engaging with the component; and
   wherein the coupling portion comprises a groove extending at least partially around a circumference of the sleeve;
a fastener device positioned within the groove to secure the component to the sleeve; and
the fitting, wherein the fitting is clamped down on the receiving portion of the sleeve and the flexible fuel hose to secure the sleeve to the flexible fuel hose.

18. The fuel system of claim 17, wherein the flexible fuel hose is comprised of a flexible polymer and is coated with a conductive pigment.

19. The fuel system of claim 17, wherein the component is selected from one of a nut, a B-type nut, a union, a bulkhead, and a flareless fitting.

20. The fuel system of claim 17, wherein:
the fitting comprises clamping feet and threads along an inner surface of the fitting;
the threads are positioned closer to the flange section than the clamping feet when the fitting is secured to the sleeve;
the extension ends before the clamping feet such that the clamping feet apply pressure to the flexible hose when the fitting is secured to the sleeve; and
wherein the tubular portion of the sleeve extends past the clamping feet such that the sleeve counteracts a deflection of the flexible fuel hose into a flow path created by the flexible fuel hose and the sleeve in response to the pressure being applied by the fitting.

* * * * *